United States Patent Office 3,131,201
Patented Apr. 28, 1964

3,131,201
RESINOUS COMPOSITION CAPABLE OF IMPARTING THIXOTROPIC PROPERTIES AND METHOD OF FORMING SAME
Almon G. Hovey, Northford, Conn., assignor, by mesne assignments, to General Mills, Inc., Minneapolis, Minn., a corporation of Delaware
No Drawing. Filed Apr. 22, 1960, Ser. No. 23,916
8 Claims. (Cl. 260—404.5)

This invention relates to thixotropic compositions and more particularly to novel agents for imparting thixotropic properties to protective and decorative coating compositions.

It has been for some time the endeavor of the paint industry as well as other branches of the protective and decorative coating industries, to provide means for achieving thixotropy in conventional coating compositions. The search for means for imparting thixotropy to coating compositions has been based primarily upon a desire to overcome certain undesirable characteristics of coating compositions, both with respect to the packaging and to the application of such compositions and to add certain new characteristics not heretofore available. With respect to packaging, the separation and settling of a pigment from the vehicle in which it was originally suspended has long been a major problem for the manufacturer, retailer and ultimate consumer. In the application of the coating composition, the tendency of the composition to drip from the paint brush or other applicator and to splatter the immediate surroundings had been a major drawback to the more wide spread use of such compositions. The possibility of accidentally spilling the contents of any container has always been a further hazard. In addition, the occasional user has always been deterred from undertaking any substantial painting project by the unsatisfactory results which were frequently obtained. Unsatisfactory results have heretofore been obtained due to sagging and running of applied paint coatings as well as excessive dripping and spattering as the paint is being applied. Flooding and floating of colored substances in the paint add to the unsatisfactory results obtained. It was known that imparting a thixotropic consistency to coating compositions enabled one to overcome to some degree the various drawbacks which prevented coating compositions such as paints and decorative coatings from finding the largest possible market.

Various means have been employed to achieve thixotropy and some have enjoyed a certain degree of success. Among the means employed by the prior art were the use of a wide variety of agents and various modifications of the physical characteristics of the compositions. Among the agents which have been used are bodied oils, water and fatty acid soaps such as aluminum stearate. Such modifications of the physical characteristics as regulation of the pigment particle size and increase of the viscosity of the vehicle were among the expedients which were also employed in previous efforts to impart thixotropic properties to conventional coating compositions. Many of these agents and modifications have been inadequate in realizing the full benefits which are possible from rendering a coating composition thixotropic.

More recently the polyamide resins derived from polymerized fatty acids have been used to obtain thixotropy in coating compositions. The polyamide resin-containing thixotropic vehicles are prepared by dispersing a polyamide resin, prepared by the reaction of an alkylene diamine with polymerized fatty acids, into a conventional coating composition vehicle. Such thixotropic vehicles have found a ready acceptance in the industry, illustrating the widely recognized need for products of this nature. However, the thixotropic vehicles containing these fatty acid polyamide resins must be formed by cooking the solvent-free vehicle with the resin at an elevated temperature considerably above the melting point of the polyamide resin.

However, there still exists a demand for additional agents which can effectively impart thixotropic properties to conventional coating compositions which contain solvents and other ingredients. More particularly, there exists a need for a thixotropy imparting agent which has the power to render vehicles thixotropic even in the presence of solvent, and particularly in vehicles which are already dissolved in a solvent. This capability in a thixotropy-imparting agent would make it possible to disperse the agent directly into a surface coating composition containing solvent to impart thixotropy thereto.

It is an object of the present invention to provide novel agents for imparting thixotropy to protective and decorative coating compositions.

It is another object of this invention to provide novel agents for rendering coating compositions thixotropic which can be more readily incorporated into the coating compositions.

It is another object of this invention to provide novel agents for imparting thixotropic properties to coating compositions which can be incorporated into the coating compositions at relatively low temperatures.

It is an additional object of this invention to provide novel thixotropy imparting agents which are capable of rendering coating compositions thixotropic even in the presence of solvent contained in the compositions.

It is also an object of this invention to provide a novel process for the preparation of thixotropy imparting agents.

It is a further object of this invention to provide a novel process for the preparation of thixotropy imparting agents wherein said agents are prepared in the presence of the vehicle to which thixotropy is to be imparted.

Other objects will in part be obvious and will in part appear hereinafter.

It has been discovered that in one of its broader aspects the above and other objects can be achieved by the novel compositions of the present invention which comprise the products obtained by the reaction of an alkylene diamine having from two to six carbon atoms and two terminal primary amines with a copolymer formed by reaction of a glyceride oil of polyunsaturated fatty acids having an iodine value above 130, with a conjugated alicyclic diene hydrocarbon monomer. Such compositions have been found to be highly effective agents for imparting thixotropic properties to conventional coating compositions. A major advantage of the novel compositions of the present invention is the ease with which they can be incorporated into conventional coating compositions. More particularly, it has been found that the novel agents of this invention can be incorporated into coating compositions which already contain solvent.

This application is a continuation-in-part of S.N. 675,815, filed August 2, 1957, and now abandoned.

In one of its narrower aspects the novel thixotropic agents of the present invention can be prepared by the following general procedure. A copolymer is selected from the group of oils indicated below and is charged to a suitably agitated reactor and preheated to a temperature of about 110° C. The alkylene diamine is then added to the reaction mixture while maintaining heat and agitation. When all of the alkylene diamine has been added the reaction mixture is subjected to further heating for an additional period of about 3 hours while agitating the mixture continuously. During this period the temperature gradually rises to about 220° C. and the water present distills over.

Alternatively the oil may be added to the preheated and agitated alkylene diamine at a temperature at which an appreciable rate of reaction is found. At temperatures above the boiling point of the alkylene diamine pressure apparatus is employed.

While further treatment of the product is not absolutely essential it has been found desirable to subject the product to a stripping operation to remove the glycerine split off in the course of the reaction. In effecting stripping, vacuum is applied gradually and the nitrogen gas, if such has been employed, is stopped. Over a period of about 4 hours or less, glycerine is removed at about 210° C. and about 15 mm. of mercury pressure. Removal of the final traces is carried out at 230° C. and 10 mm. of mercury. The reaction mixture is then cooled to about 150° C. and discharged into shallow trays and permitted to stand and cool for about 12 to 24 hours. The resin solidifies during this cooling period and can be broken up for further use or for packaging.

In general, for best results chemically equivalent quantities, i.e. based on gram equivalent weights of the reactants will be employed in preparing the novel thixotropic agents of the present invention. However, it is to be understood that a slight excess of either reactant can be employed.

Highly thixotropic vehicles can be prepared from resins made from copolymer oils which have a viscosity of Gardner Z or more, and which have a saponification number in the range of 150 to 180. The saponification number is used to determine the quantity of the alkylene diamine which is the chemical equivalent of the quantity of oil to be reacted.

For a copolymer oil having a saponification value of 150, 375 grams of oil would be reacted with each 30 grams of ethylene diamine for a reaction employing chemically equivalent quantities of reactants. For a copolymer oil having a saponification value of 170 the weight of oil used would be 330 grams.

In one of its broader aspects the novel resinous substances of the present invention may be prepared by bringing the alkylene polyamine and copolymer oil together under reactive conditions and in reactive proportions, and maintaining the reaction conditions to form a product which is a solid resinous composition at room temperature.

By reactive proportions here is meant the proportions of copolymer oil and alkylene diamine which are found, by a few scoping experiments, to react to produce a solid resinous product. The copolymer oil can be hydrogenated before use in preparing the resin.

The unsaturated glyceride oil component of the copolymer employed in the preparation of the novel thixotropic agents of the present invention may be any glyceride oil of polyunsaturated fatty acids. The oils preferred for use in connection with the present invention are the natural base glyceride oils of polyunsaturated fatty acids having an I.V. (iodine value) in excess of 130 centigrams of iodine where the iodine value is determined according to the "Wijs" method as this method is described in Treadwell-Hall, Analytical Chemistry, vol. 2, 8th ed., at page 599.

Such oils as the vegetable oils of the drying or semi-drying type, marine oils and mixtures thereof having an iodine value in excess of 130 may be used. Thus vegetable drying oils such as linseed oil, perilla oil, Chinawood oil, dehydrated castor oil and mixtures thereof may be employed. Also semi-drying oils such as hempseed oil, safflower oil, soybean oil, sunflower oil, walnut oil, poppyseed oil and others having an iodine value in excess of 130 may be employed as well as mixtures thereof. Marine oils such as menhaden oil, sardine oil, cod liver oil and mixtures thereof can also be used.

The use of oils having iodine values less than 130 with oils having values greater than 130 to make a blend with an iodine value of 130 or more, is also contemplated as being within the scope of the present invention. Similarly, oils such as cottonseed oil having initial iodine values below about 130, and which are processed as by thermal fractionation or selective solvent treatment as with acetone to bring the iodine value above 130 can be used in practicing the present invention. Particularly good results have been achieved when linseed oil has been employed as the vegetable oil component and the use of linseed oil is therefore preferred.

The unsaturated hydrocarbon monomer can be a straight chain, aliphatic conjugated diene such as butadiene or the substitution products thereof. It can be a monomer composition containing an unsaturated hydrocarbon such as styrene or other dienophiles such as vinyltoluene along with a conjugated diene monomer such as cyclopentadiene. However, the use of conjugated alicyclic dienes such as cyclopentadiene and dicyclopentadiene is preferred and in the preferred embodiment of the invention a dicyclopentadiene-linseed oil copolymer is employed. Alternatively alicyclic conjugated diene monomers such as 1,3-cyclohexadiene, 2,6-dimethyl-2,4,6-octatriene, and mixtures containing alicyclic conjugated diene monomers as the principal ingredient may be employed in forming copolymer oils useful in practicing the present invention. Further a mixture containing up to about 20% by weight of divinyl benzene with 80% dicyclopentadiene may be used to prepare a suitable copolymer oil.

No novelty is claimed for the copolymer oils per se and the glyceride oil-hydrocarbon monomer copolymers can be readily prepared by heating a mixture of the two materials in accordance with procedures which are well known to the art. Representative processes for the preparation of such copolymers are found in U.S. Patents 2,361,018, 2,387,895 and 2,443,044.

The alkylene diamine which is employed can be any alkylene diamine having from 2 to 6 carbon atoms and containing two terminal primary amine groups. Representative examples of suitable alkylene diamines are ethylene diamine, 1,2-diaminopropane, 1,3-diaminopropane, 1,4-diaminobutane, and 1,6-diaminohexane. However, it has been found that optimum results are obtained when ethylene diamine is employed in the preparation of the novel thixotropic agents, and in the preferred embodiment of the invention ethylene diamine is employed as the alkylene diamine reactant. Alkylene polyamines such as diethylene triamine have been found to produce liquid resinous products which do not impart thixotropy to surface coating vehicles when added in percentages up to 15% by weight.

Temperatures of from about 75° C. to about 300° C. can be employed in preparing the novel thixotropic agents of the present invention. However, for the achievement of optimum results it has been determined that temperatures of from about 150° C. to about 250° C. should be used. The reaction can be carried out at atmospheric, sub-atmospheric or super-atmospheric pressures. In order to minimize the possibility of any discoloration of the final product, the use of an inert atmosphere such as nitrogen is preferred.

A distinct advantage of the thixotropic agents of the present invention is the extreme ease with which they can be incorporated into a suitable vehicle. They can be readily dispersed in conventional vehicles at temperatures as low as about 100° C. to about 130° C. Since the novel thixotropic agents of the present invention have the power to render vehicles such as flat wall alkyds thixotropic even in the presence of solvent and since they may be dispersed in such vehicles at temperatures below solvent reflux temperatures, the thixotropic agents can be dispersed in commercial coating vehicle solutions rather than in the hot, unthinned coating composition vehicle. The use of agitation and of an inert atmosphere such as nitrogen or carbon dioxide during the dispersion is preferred in order to assure homogeneity and avoid any deterioration in the final product.

The vehicle into which the novel thixotropic agents of the present invention are incorporated to provide novel thixotropic compositions may be many of the conventional coating composition vehicles. For example, resin bases of the alkyd resin type, prepared by the reaction of polybasic acids with polyhydric alcohols, may be used. It is also possible to employ alkyd resins which have been modified in any manner known to the art, such as by the incorporation of vegetable oils. Varnish bases, prepared by heating natural or synthetic resins with drying oils, can likewise be used. Drying oils have also been found to be suitable for use as the vehicle.

These vehicles include substantially all oil base vehicles presently employed on a commercial scale as the basis for film forming coating compositions and the advance in the art of bodying these vehicles which has been made possible by this invention is evidenced by the fact that substantially all of these vehicles can be rendered thixotropic by incorporating the resin formed as described above into these vehicles while they contain the solvents, such as odorless mineral spirits, commonly used on a commercial scale as thinners for surface coating vehicles.

The resinous product obtained by the reaction of the alkylene diamine with the copolymer oil can be incorporated into the vehicle to provide thixotropic vehicles over a range of from about 1% to about 10% based on the non-volatile content of the vethicle. While the addition of the resin in amounts below 1% by weight will impart thixotropic properties to the vehicle the thixotropy in most instances is so slight as to be without practical significance. Similarly, while the use of amounts of resin above 10% by weight may be satisfactory in some cases it will be found that the use of such large amounts of resin in other vehicles will render the vehicle too thick for use. The amount of resin which is to be added to the vehicle is dependent upon such factors as the nature of the vehicle and its original viscosity. In general, the preferred range over which the resin can be added to the vehicle is from about 4% to about 8% based upon the non-volatile content of the vehicle.

In an alternative method of preparation the thixotropic agent can be formed in the presence of some of the vehicles to which thixotropy is to be imparted. Where such an "in situ" method of preparation is employed, ethylene diamine and a vegetable oil-hydrocarbon copolymer can be pre-mixed and warmed in a steam-heated vessel before admixture with the vehicle. Such a procedure is a short cut in that it avoids need for separate reaction of the components and is particularly suitable for large scale manufacture. The final composition is formed by the heating of the complete mixture of the components. The temperature employed can range from about 75° C. to about 300° C., although the use of temperatures of from about 150° C. to about 250° C. is preferred. Atmospheric, sub-atmospheric, and super-atmospheric pressure can be employed and the use of an inert atmosphere, such as nitrogen is desirable.

The novel thixotropy imparting agents of the present invention are hard, non-brittle resins having softening points of from about 90° C. to about 115° C. as determined by the ring-and-ball method (A.S.T.M. E2851T). They are characterized by color of from 10 to 15 determined by comparison of the melted resin with Gardner color standards tubes. The resins exhibit viscosities of from 30 to 70 centipoises by Brookfield viscosimeter, using a No. 2 spindle at 20 r.p.m., the temperature of the resin being 150° C. at the time of the viscosity determination.

For a fuller understanding of the present invention, reference should be had to the following examples. It is to be understood, however, that these examples are merely illustrative and are not to be construed as limiting the scope of the present invention. In the following examples all parts given art parts by weight.

*Example I*

2,650 parts of dicyclopentadiene-linseed oil copolymer were charged to an autoclave and warmed to about 100–110° C., 260 parts of 92% ethylene diamine were then gradually introduced and the temperature brought to 200° C. and held for a total heating period of 10 hours. The distillate was collected and drawn off and heating discontinued. The resinous product was stripped at 244° C. and 1 mm. pressure. At the end of the stripping operation the reaction product was discharged into trays and permitted to cool overnight. The product was a hard non-brittle resin having a softening point of 98–100° C. by the ring-and-ball method, a melted resin color of 13 by comparison with the Gardner color standards, an acid value of 1.5, an amine value of 13.0, a specific gravity of 0.990 and a viscosity of 56 centipoises, determined by Brookfield viscosimeter, using a No. 2 spindle at 20 r.p.m. and 150° C.

*Example II*

81.5 parts of dicyclopentadiene-linseed oil copolymer were charged to an autoclave. The copolymer was warmed to 100–110° C. and addition of 8.05 parts of 94% ethylene diamine was commenced. The addition was effected at atmospheric pressure with continuous agitation of the reaction mixture. A protective blanket of nitrogen was employed in order to prevent discoloration of the resin. After all of the ethylene diamine was in the temperature was gradually raised over a period of three hours to a maximum of 230° C. At the end of this period the aqueous distillate was collected and drawn off and the heating discontinued. The autoclave was then closed and the resinous product was stripped at 235° C. and 2 mm. pressure. The autoclave was then cooled to 150° C. and the contents poured out into trays and allowed to cool over night. The product was a hard, non-brittle resin having a softening point of 94–96° C. by the ring-and-ball method, a color of 12 determined by comparison of the melted resin with Gardner color standards, an acid value of 1.1, an amine value of 16.0, a specific gravity of 0.979, and a viscosity of 52 centipoises, determined by Brookfield viscosimeter using a No. 2 spindle at 20 r.p.m. at 150° C.

*Example III*

2,650 parts of dicyclopentadiene-soybean oil copolymer were charged to an autoclave and warmed to about 100–110° C. 260 parts of 92% ethylene diamine were then gradually introduced and the temperature brought to 200° C. and held for a total heating period of 10 hours. The distillate was collected and drawn off and heating discontinued. The resinous product was stripped at 244° C. and 1 mm. pressure. At the end of the stripping operation the reaction product was discharged into trays and permitted to cool over night. The product was a hard, non-brittle resin having a softening point of 98–100° C. by the ring-and-ball method, a melted resin color of 13 by comparison with Gardner color standards, an acid value of 1.5, an amine value of 13.0, a specific gravity of 0.990 and a viscosity of 56 centipoises, determined by Brookfield viscosimeter using a No. 2 spindle at 20 r.p.m. and 150° C.

*Example IV*

The product of Example II was evaluated as a thixotropic agent by dispersing 10 parts of the resin in 143 parts of a 70% solution of a long oil, air drying, architectural enamel type alkyd. This alkyd is a pentaerythritral-soybean oil alkyd having a phthalic anhydride content of 24%, an oil content of 65%, an acid value of 4, a specific gravity of 0.955 in 70% solution and a viscosity of 25 to 30.2 stokes at 25° C. in 70% solution in mineral spirits (kauri-butanol 34.36) and 107 parts of mineral spirits by heating at 150° C. for 3½ hours. The resulting composition was characterized by good thixotropy, and good recovery of thixotropy, after release from stress.

*Example V*

69.2 parts of the product of Example I were charged to a reaction vessel and 2100 parts of a 40% solution of pentaerythritral-soybean oil flat wall type alkyd having a phthalic anhydride content of 32%, an oil content of 52%, an acid value of 10, a specific gravity of 0.880, and a viscosity of 22.7–30.2 stokes at 25° C. in mineral spirits, together with 79.5 parts of mineral spirits (kauri-butanol 36) were added thereto. The mixture was heated at 150° C. with continuous agitation for a period of 3½ hours. At the end of this period the product, a semi-stiff paste was tried in the paint composition of Example VI to determine its thixotropy imparting qualities.

*Example VI*

A paint composition was prepared having the following composition, all parts being parts by weight:

| | Parts |
|---|---|
| Composite TiO$_2$—CaCO$_3$ | 1100 |
| Whiting | 300 |
| Composition of Example V | 692 |
| 24% lead naphthanate | 4 |
| 6% cobalt naphthanate | 2 |
| Antiskinning agent | 4 |
| Heavy mineral spirits (kauri-butanol 34) | 134 |

The paint had satisfactory thixotropy as shown by the following viscosity data, obtained by Brookfield viscosimeter using a No. 6 spindle at 25° C.

| Revolutions per minute | Viscosity in centipoises |
|---|---|
| 2 | 37,000 |
| 4 | 24,000 |
| 10 | 16,000 |
| 20 | 10,600 |
| 10 | 12,000 |
| 4 | 14,500 |
| 2 | 17,000 |

*Example VII*

2330 g. alkali refined linseed oil and 512 g. of dicyclopentadine (90–92% reactive) were charged in a stainless steel autoclave and heated with agitation for approximately 5 hours at 270–280° C., until the bodied oil copolymer had a Gardner viscosity of Z3 and color of 8. The unreacted volatiles were stripped off by vacuum from the oil copolymer at this point. The batch was then cooled to 100–110° C. at which point 260 parts of ethylene diamine were gradually introduced. The temperature was brought up to 200° C. and held for a total heating period of approximately 10 hours. At this point the distillate was drawn off and the resinous product stripped off by high vacuum at 240–245° C. and at about 1 mm. pressure. At the end of stripping, the resin was cooled in the autoclave under vacuum to approximately 150° C., then discharged into trays and allowed to solidify. The resin has a ring-and-ball softening point of 92–95° C., color 12 (Gardner) and amine value of 19.

*Example VIII*

78.5 parts of dicyclopentadiene-linseed oil copolymer were charged to an autoclave. The copolymer was warmed to about 100–110° C. and addition of 16.2 parts of a 72% aqueous solution of 1,6-hexane diamine was begun. The addition was carried out at atmospheric pressure with continuous agitation of the reaction mixture. The temperature was then raised rapidly to about 150° C. and the major amount of water present was removed. The temperature was then gradually raised over a period of about three hours to a maximum of 230° C. The autoclave was then closed and the resinous product stripped at 240° C. and 5 mm. pressure. The product was a hard, non-brittle resin having a softening point of 83–85° C. by the ring-and-ball method and a melted resin color of 14 by comparison with Gardner color standards.

*Example IX*

The product of Example VIII was evaluated as a thixotropic agent by dispersing it in an alkali refined linseed oil in the proportion of 1 part of the product of Example VIII to 12 parts of alkali refined linseed oil by heating at 85° C. for about 1 hour. The resultant composition was characterized by good thixotropy and good recovery of thixotropy.

While the thixotropic vehicles of the present invention have been employed in certain percentages in the preparation of the paint compositions set out in certain of the preceding examples, it will be obvious to those skilled in the art that other proportions can also be employed. The quantity of thixotropic vehicles to be incorporated into particular paint compositions will depend upon the nature of the paint, that is of the paint vehicle, its original viscosity, the proportion of pigment to vehicle in the paint, and upon the particular coating qualities desired. The amount required can be readily ascertained by determining the Brookfield viscosity of representative samples at varying rates of shear and selecting the proper percentages on the basis of the thixotropy pattern shown by the viscosities at the varying rates of shear.

The vehicles into which the novel resin of the present invention may be incorporated to impart thixotropy include those containing glyceride oils, oil modified alkyd resins, and varnish ester bodies as the principal ingredient. As used herein glyceride oils include any natural base oil, which upon saponification, will yield glycerine. As used herein oil modified alkyd resins include the reaction products of one or more dibasic acids, one or more polyols, one or more vegetable oils and/or their fatty acids and as an optional reactant, resin acids and/or phenolic resins. These modified alkyd resins are more fully described in chapter 13 of "Protective and Decorative Coatings," by Mattiello, volume 1, published 1941 by John Wiley and Sons. As the term is used herein varnish ester bodies are oleoresinous varnishes containing a hard resin and one or more drying oils in mineral spirits. The hard resin in these bodies may be natural resins, ester gum, modified phenolics and/or pure phenolics.

Since many examples of the foregoing procedures, compositions and articles may be carried out and made, and since many modifications can be made in the procedures, compositions and articles described without departing from the scope of the subject invention, the foregoing is to be interpreted as illustrative only, and not as defining or limiting the scope of the invention.

What is claimed is:

1. An agent for imparting thixotropic properties to coating compositions which comprises the solid product obtained by reacting an alkylene diamine having from two to six carbon atoms with a copolymer formed by reaction of a glyceride oil of polyunsaturated fatty acids having an iodine value above 130 and a diene selected from the group consisting of cyclopentadiene and dicyclopentadiene.

2. An agent for imparting thixotropic properties to coating compositions which comprises the solid product obtained by reacting an alkylene diamine having from two to six carbon atoms with a copolymer formed as the reaction product of a glyceride oil of a polyunsaturated fatty acid and a diene selected from the group consisting of cyclopentadiene and dicyclopentadiene, said glyceride oil being selected from the group consisting of linseed oil, China-wood oil, dehydrated castor oil, soybean oil, cottonseed oil, menhaden oil and sardine oil.

3. The agent of claim 2 wherein the diamine is ethylene diamine.

4. The agent of claim 2 wherein the diamine is ethylene diamine and the copolymer is a dicyclopentadiene-linseed oil copolymer.

5. The agent of claim 2 wherein the diamine is ethylene diamine and the copolymer is a dicyclopentadiene-soybean oil copolymer.

6. A process for the preparation of an agent capable of imparting thixotropic properties to coating compositions which comprises reacting an alkylene diamine having from two to six carbon atoms with a copolymer formed as the reaction product of a glyceride oil of a polyunsaturated fatty acid and a diene selected from the group consisting of cyclopentadiene and dicyclopentadiene at a temperature of from 75 to 300° C., heating the reaction mixture for at least one hour at said temperature range, removing the formed glycerine and cooling the reaction product to obtain a hard non-brittle resin.

7. The process of claim 6 wherein the glyceride oil is selected from the group consisting of linseed oil, Chinawood oil, dehydrated castor oil, soybean oil, cottonseed oil, menhaden oil and sardine oil.

8. The process of claim 7 wherein a reaction temperature of about 150 to 250° C. is employed and the reaction is performed in an inert atmosphere.

References Cited in the file of this patent

UNITED STATES PATENTS

| | | |
|---|---|---|
| 2,322,240 | Kropa | June 22, 1943 |
| 2,361,018 | Gerhart | Oct. 24, 1944 |
| 2,387,895 | Gerhart | Oct. 30, 1945 |
| 2,443,044 | Lycan et al. | June 8, 1948 |
| 2,483,797 | Valkenburgh | Oct. 4, 1949 |
| 2,600,943 | Valkenburgh | June 17, 1952 |
| 2,610,964 | Ewart et al. | Sept. 16, 1952 |
| 2,861,048 | Wright et al. | Nov. 18, 1958 |
| 2,889,292 | Peerman | June 2, 1959 |